US008840025B2

(12) United States Patent
Madej et al.

(10) Patent No.: US 8,840,025 B2
(45) Date of Patent: Sep. 23, 2014

(54) ARRANGEMENT FOR AND METHOD OF PREVENTING SYMBOL MISREADS IN ELECTRO-OPTICAL READERS

(75) Inventors: Dariusz J. Madej, Shoreham, NY (US); Dayou Wang, Mount Sinai, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 156 days.

(21) Appl. No.: 13/534,013

(22) Filed: Jun. 27, 2012

(65) Prior Publication Data

US 2014/0001259 A1    Jan. 2, 2014

(51) Int. Cl.
*G06K 7/10*    (2006.01)
*G06K 9/36*    (2006.01)
*G06K 9/80*    (2006.01)

(52) U.S. Cl.
USPC ...................................................... 235/462.1

(58) Field of Classification Search
CPC ........................................................ G06K 7/14
USPC ......................................... 235/462.1, 462.11
See application file for complete search history.

(56) References Cited

U.S. PATENT DOCUMENTS

| 5,420,410 | A | 5/1995 | Bremer |
| RE35,117 | E | 12/1995 | Rando et al. |
| 5,773,807 | A | 6/1998 | Barkan et al. |
| 5,912,452 | A | 6/1999 | Wiklof et al. |
| 6,039,252 | A | 3/2000 | Maltsev |
| 6,047,889 | A | 4/2000 | Williams et al. |
| 6,095,420 | A | * | 8/2000 | Kawai et al. ............. 235/462.16 |
| 6,189,784 | B1 | 2/2001 | Williams et al. |
| RE37,166 | E | 5/2001 | Rando et al. |
| 6,540,143 | B1 | 4/2003 | Matsumori |
| 6,554,190 | B1 | 4/2003 | Tsuno |
| 6,874,690 | B2 | 4/2005 | Lucera et al. |
| 7,416,125 | B2 | 8/2008 | Wang et al. |
| 7,753,269 | B2 | 7/2010 | Russell et al. |
| 7,757,955 | B2 | 7/2010 | Barkan |
| 7,821,400 | B2 | 10/2010 | Tabet et al. |
| 2010/0163625 | A1 | 7/2010 | Madej et al. |
| 2010/0282850 | A1 | 11/2010 | Olmstead et al. |
| 2011/0062238 | A1 | 3/2011 | Good |
| 2011/0174881 | A1 | 7/2011 | Samek et al. |
| 2011/0309147 | A1 | 12/2011 | Barkan et al. |
| 2012/0153022 | A1 | 6/2012 | Havens et al. |

OTHER PUBLICATIONS

International Search Report and Written Opinion in counterpart application PCT/US2013/041338 mailed Aug. 30, 2013.

* cited by examiner

*Primary Examiner* — Jamara Franklin
(74) *Attorney, Agent, or Firm* — Nong-Qiang Fan

(57) ABSTRACT

An arrangement for, and a method of, preventing a misread of a one-dimensional symbol that can be read in either one of two polarities in an electro-optical reader. A data capture assembly captures light from the symbol, and generates an electrical signal indicative of the captured light. A controller simultaneously processes and decodes the electrical signal as a first decoded result of one of the polarities and as a second decoded result of the other of the polarities. The controller also determines the validity of the first and second decoded results, and generates an output in dependence upon the validity determination.

16 Claims, 4 Drawing Sheets

ARRANGEMENT FOR AND METHOD OF PREVENTING SYMBOL MISREADS IN ELECTRO-OPTICAL READERS

FIELD OF THE DISCLOSURE

The present disclosure relates generally to an arrangement for, and a method of, preventing misreads of a one-dimensional symbol that can be read as a normal code in one polarity, and as an inverse code in another polarity, in an electro-optical reader capable of reading both polarities and, more particularly, to successfully reading a GS1 DataBar-14 symbol or a GS1 DataBar Expanded symbol, each having finder patterns of bars and spaces differently decodable in the two polarities.

BACKGROUND

Moving laser beam readers or laser scanners, as well as solid-state imaging systems or imaging readers, have both been used, in both handheld and hands-free modes of operation, to electro-optically read bar code symbols having different bar and space patterns that are used to represent different characters. Sets of these patterns are grouped together to form a symbology. There are many types of bar code symbologies, each having their own special characteristics and features. Most symbologies are designed to meet the needs of a specific application or industry. One omnipresent symbology is the Universal Product Code (UPC) Version A (UPC-A) symbol, which is comprised of a linear or one-dimensional arrangement of bars and spaces (each termed as an element) of different light reflectivities and of various widths that, when decoded, uniquely identify a product and its manufacturer.

The moving laser beam reader generally includes a laser for emitting a laser beam, a focusing lens assembly for focusing the laser beam to form a beam spot having a certain size at a focal plane in a range of working distances, a scan component for repetitively scanning the beam spot across a symbol in a scan pattern, for example, one or more scan lines, across the symbol multiple times per second, e.g., forty times per second, a photodetector for detecting return light reflected and/or scattered from the symbol and for converting the detected return light into an analog electrical signal, and signal processing circuitry including a digitizer for digitizing the analog signal, and a microprocessor for decoding the digitized signal based upon a specific symbology used for the symbol.

The imaging reader generally includes a solid-state imager or sensor having an array of cells or photosensors, which correspond to image elements or pixels in a field of view of the imager, an illuminating light assembly for illuminating the field of view with illumination light from an illumination light source, e.g., one or more light emitting diodes (LEDs), and an imaging lens assembly for capturing return ambient and/or illumination light scattered and/or reflected from the symbol being imaged over a virtual scan pattern over a range of working distances. Such an imager may include a one- or two-dimensional charge coupled device (CCD) or a complementary metal oxide semiconductor (CMOS) device and associated electronic circuits for producing electronic analog signals corresponding to a one- or two-dimensional array of pixel information over the field of view. Again, signal processing circuitry including a digitizer is used for digitizing the analog signal, and a microprocessor is used for decoding the digitized signal based upon a specific symbology used for the symbol.

As advantageous as both types of readers are in reading symbols, it is desirable in many applications for each reader to read symbols of different polarities, i.e., "normal" codes and "inverse" codes, and to obtain the same decoded result no matter the symbol polarity. A "normal" (or regular or direct) code is a code where the bars are of less light reflectivity than the background, which background includes the spaces between the bars (e.g., black/dark bars on a white/light background). An "inverse" code is a code where the bars are more reflective than the background on which they are disposed including the spaces therebetween (e.g., white/light bars on a black/dark background). Although symbols are normally printed on products as normal codes, some product manufacturers insist on printing the symbols as inverse codes due to the nature of the product and its packaging.

For most symbologies, including the UPC-A symbology described above, the reader can detect whether the symbol is a normal or an inverse code, for example, by evaluating the reflectivity of the right and left outer margins disposed at opposite ends of the code. Once the reader knows what type of code polarity is being read, the microprocessor can properly set the digitizer to digitize the code with the correct polarity, and properly decode the symbol with the correct polarity setting.

However, not all symbologies have such margins. For example, the GS1 Databar Code family is a recent barcode symbology for space-constrained identification from GS1. Databar codes have been utilized to solve many problems in point-of-sale, grocery and healthcare, applications, where products are too small to allow for traditional UPC-A symbols, or where additional information needs to be encoded. In the Databar family, the Databar-14 symbol is a 14-digit data structure comprised of a linear arrangement of bars and spaces (each termed as an element) of different light reflectivities and of various widths that, when decoded, uniquely identify a product and its manufacturer. In addition, GS1 DataBar Expanded is an analogous, but longer, bar-and-space data structure that can encode additional information, such as sell-by or expiration date, product weight, country of origin, serial number, and lot number, and is seeing increased use in manufacturers' coupons. Thus, the Databar symbol family is designed to replace or expand use of the UPC-A symbol, as well as to provide additional information and, thus, provides for greater product identification, traceability, quality control, and more flexible coding for coupon applications.

Yet, as advantageous as the Databar-14 and the Databar Expanded symbols have become, they do not have the aforementioned left and right outer margins and, thus, their polarity cannot be determined by the readers in the same manner as that described above for UPC-A symbols. As best shown in FIG. 3, the Databar-14 structure is composed of two data blocks or segments, each containing a 5-element finder pattern and two adjacent data characters. The left finder pattern contains a space-bar-space-bar-space sequence, while the right finder pattern contains a bar-space-bar-space-bar sequence. There are nine finder pattern variants, all valid for each of the left and right finder patterns. The Databar Expanded structure can be of variable length ranging from two blocks or segments to eleven blocks or segments. The exemplary Databar Expanded structure shown in FIG. 4 is composed of three data blocks, each containing a 5-element finder pattern and two adjacent characters. An A1 finder pattern and a B1 finder pattern each contains a space-bar-space-bar-space sequence, while a B2 finder pattern contains a bar-space-bar-space-bar sequence.

One concern for a reader that is capable of reading both normal and inverse Databar-14 or Databar Expanded symbols is that a symbol misdecode or misread may occur, because of confusion between the finder patterns, and the lack of an outer margin to determine the symbol polarity. More specifically, the right finder pattern is, by design, already the inverse of the left finder pattern in the Databar-14 symbol of FIG. 3. Thus, without knowing the polarity, the reader may interpret the right finder pattern as the left finder pattern, or vice versa, and, as a result, a different incorrect code will be read. Analogously, the B2 finder pattern in the Databar Expanded symbol of FIG. 4 is, by design, already the inverse of the A1 finder pattern or the B1 finder pattern, and, hence, may be interpreted as the A1 finder pattern or the B1 finder pattern, or vice versa, and, as a result, a different incorrect code will again be read.

Once it was revealed that Databar-14 or Databar Expanded symbols could be interpreted and decoded differently when printed as normal or inverse codes, the prior art made the printing of inverse Databar symbols of any variant illegal. In response, many reader manufacturers disabled the ability to decode inverse Databar symbols. However, this was an unsatisfactory solution, because some customers still insist on printing both normal and inverse Databar symbols and fully expect that their readers should be able to read them.

Accordingly, there is a need for an arrangement for, and a method of, enabling such normal and inverse codes to both be printed, and to enable such readers to read both normal and inverse codes to satisfy customer expectations, while preventing misdecodes of such Databar symbols in such readers.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 2:
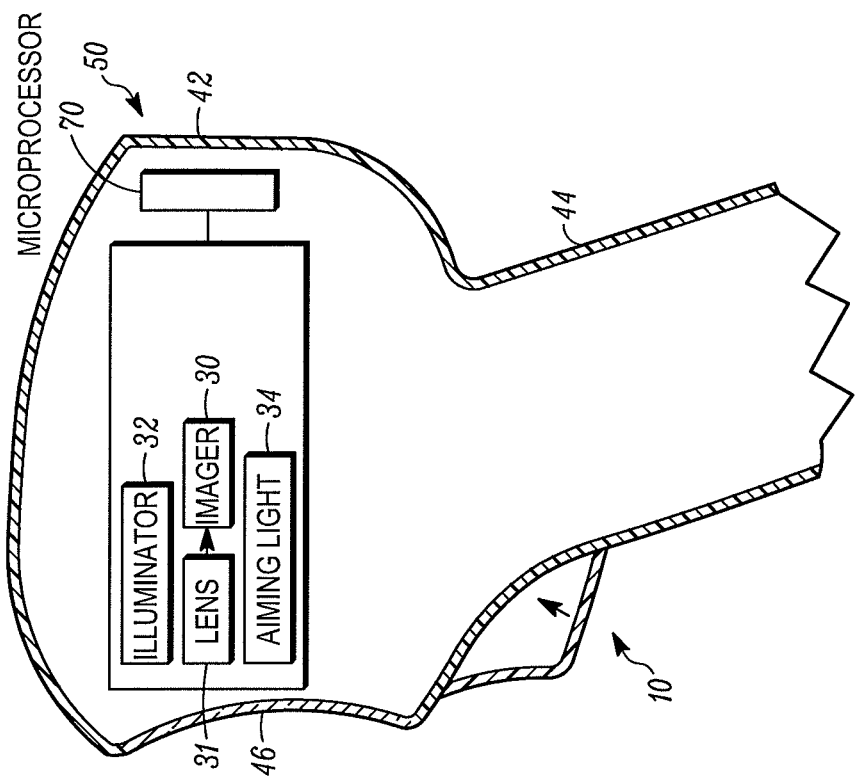
FIG. 2 is a schematic diagram of a handheld imaging reader for electro-optically reading symbols in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One feature of this invention resides, briefly stated, in an arrangement for, and a method of, preventing a misread of a one-dimensional symbol that can be read in either one of two polarities in an electro-optical reader. The symbol has bars alternating with spaces. The bars have less reflectivity than the spaces when the symbol is a normal code indicative of one of the polarities. The spaces have less reflectivity than the bars when the symbol is an inverse code indicative of the other of the polarities. Typically, the symbol is a GS1 DataBar-14 symbol or a GS1 DataBar Expanded symbol, each having finder patterns of bars and spaces differently decodable in the two polarities. The arrangement comprises a data capture assembly for capturing light from the symbol, and for generating an electrical signal indicative of the captured light; and a controller for simultaneously processing and decoding the electrical signal as a first decoded result of one of the polarities and as a second decoded result of the other of the polarities, for determining validity of the first and second decoded results, and for generating an output in dependence upon the validity determination.

In one embodiment, the reader is a moving laser beam reader, and the data capture assembly includes a laser for emitting a laser beam, a scanner for sweeping the laser beam in a scan pattern across the symbol for reflection and scattering therefrom, and a detector for detecting the captured return light from the symbol. In another embodiment, the reader is an imaging reader, and the data capture assembly advantageously includes an illuminator for illuminating the symbol, and a solid-state imager, such as a charge coupled device (CCD) or a complementary metal oxide semiconductor (CMOS) device, having a one- or two-dimensional array of sensors for detecting the return light from the symbol.

In accordance with an aspect of this invention, the controller is operative for generating the output as the first decoded result if the first decoded result is valid and the second decoded result is invalid, or for generating the output as the second decoded result if the second decoded result is valid and the first decoded result is invalid. The controller is also operative for generating the output as no result, or as a predetermined one of the first decoded result and the second decoded result, if both the first decoded result and the second decoded result are valid. The controller advantageously determines validity by checking each of the results with a checksum function.

Figure 1:
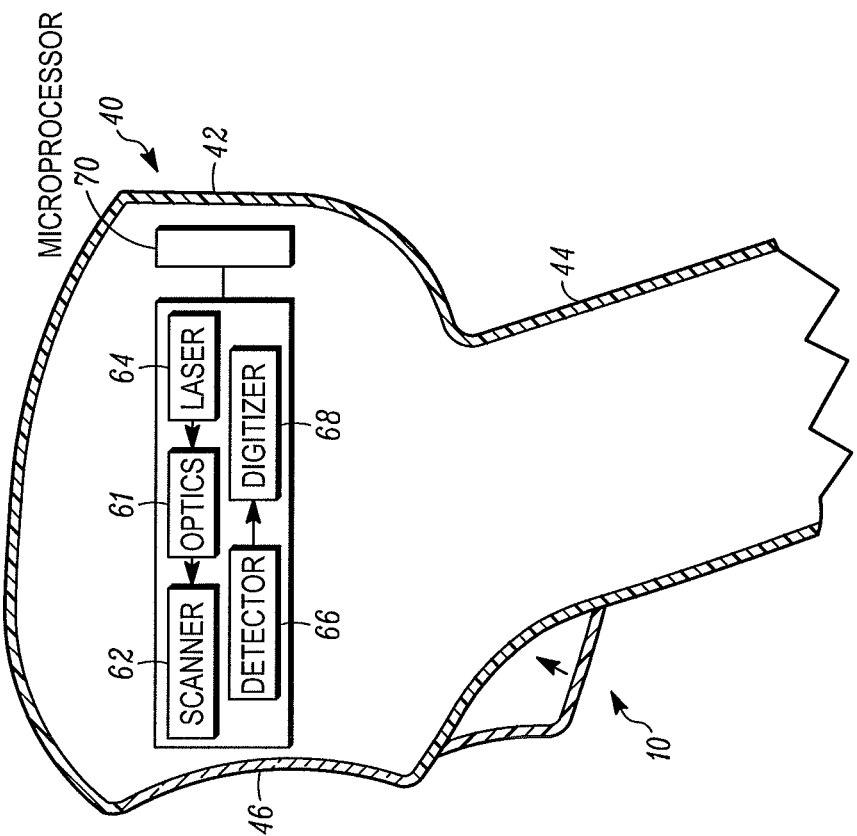
FIG. 1 is a schematic diagram of a handheld moving laser beam reader for electro-optically reading symbols in accordance with the present invention.

Turning now to the drawings, FIG. 1 depicts a moving laser beam reader 40 for electro-optically reading symbols of different polarities that may use, and benefit from, the present invention. The beam reader 40 comprises a data capture assembly including a scanner 62 in a handheld housing 42 having a handle 44 on which a trigger 10 for initiating reading is mounted. The scanner 62 is operative for scanning an outgoing laser beam from a laser 64 and/or a field of view of a light detector or photodiode 66 in a scan pattern, typically comprised of one or more scan lines, multiple times per second, for example, forty times per second, through a window 46 across the symbol for reflection or scattering therefrom as return light detected by the photodiode 66 during reading. The data capture assembly of the beam reader 40 also includes a focusing lens assembly or optics 61 for optically modifying the outgoing laser beam to have a large depth of field, and a digitizer 68 for converting an electrical analog signal generated by the detector 66 from the return light into a digital signal for subsequent decoding by a microprocessor or controller 70 into data indicative of the symbol being read.

FIG. 2 depicts an imaging reader 50 for imaging symbols of different polarities to be electro-optically read, which may use, and benefit from, the present invention. The imaging reader 50 comprises a data capture assembly including a one- or two-dimensional, solid-state imager 30, preferably a CCD or a CMOS array, mounted in the handheld housing 42 having the handle 44 on which the trigger 10 for initiating reading is mounted. The imager 30 has an array of image sensors operative, together with an imaging lens assembly 31, for capturing return light reflected and/or scattered from the symbol through the window 46 during the imaging to produce an electrical signal indicative of a captured image for subsequent digitizing and decoding by the controller 70 into data indicative of the symbol being read. When the reader 50 is operated in low light or dark ambient environments, the data capture assembly of the imaging reader 50 includes an illuminator 32 for illuminating the symbol during the imaging with illumination light directed from an illumination light source through the window 46. Thus, the return light may be derived from the illumination light and/or ambient light. The illumination light source preferably comprises one or more light emitting diodes (LEDs). An aiming light generator 34 may also be provided for projecting an aiming light pattern or mark on the symbol prior to imaging.

In operation of the imaging reader 50, the controller 70 sends a command signal to drive the illuminator LEDs 32 for a short time period, say 500 microseconds or less, and energizes the imager 30 during an exposure time period of a frame to collect light from the symbol during said time period. A typical array needs about 16-33 milliseconds to read the entire symbol image and operates at a frame rate of about 30-60 frames per second. The array may have on the order of one million addressable image sensors.

Figure 3:
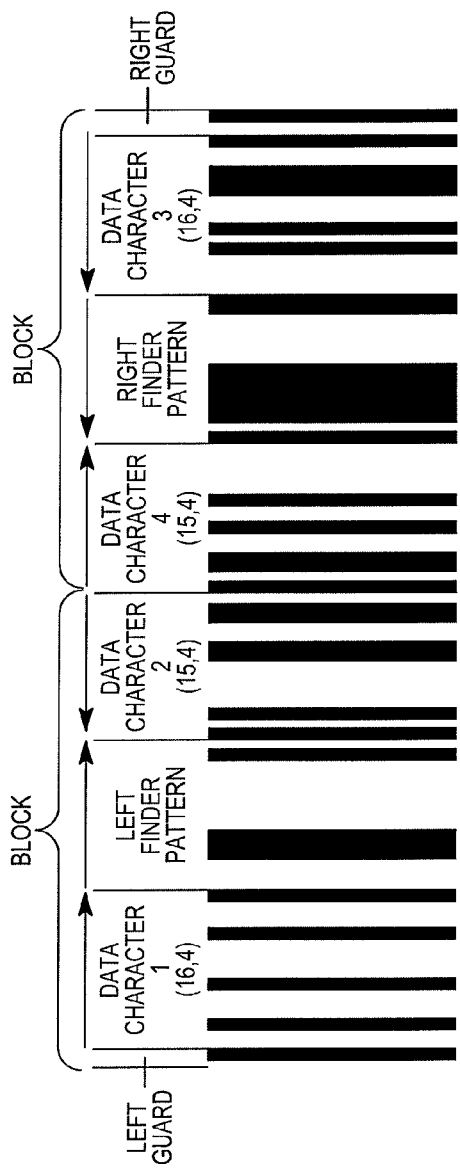
FIG. 3 is a view of a Databar-14 symbol depicting its structure in accordance with the prior art.

FIG. 3 depicts a standard GS1 DataBar-14 symbol data structure, which is a 14-digit data structure (including a non-visible checksum-digit) comprised of a linear arrangement of bars and spaces (each termed as an element) of different light reflectivities and of various widths that, when decoded, uniquely identify a product and its manufacturer. Each bar or space can have different widths. The narrowest width is termed a "module" and, thus, each bar and each space has a width which may be an integral number of modules wide. The DataBar-14 symbol is composed of two segments or data blocks, each containing a 5-element finder pattern and two adjacent data characters 1 and 2 or 3 and 4. Data characters 1 and 3 are encoded as four bars and four spaces within sixteen modules and is commonly described by a (16, 4) designation. Data characters 2 and 4 are encoded as four bars and four spaces within fifteen modules and is commonly described by a (15, 4) designation. The left finder pattern contains a space-bar-space-bar-space sequence, while the right finder pattern contains a bar-space-bar-space-bar sequence. There are nine finder pattern variants, all valid for each of the left and right finder patterns. Left and right guards are disposed at opposite ends of the symbol. Each guard is comprised of one space and one bar. As is well known, the checksum-digit is mathematically based on values of the finder patterns and the data characters.

Figure 4:
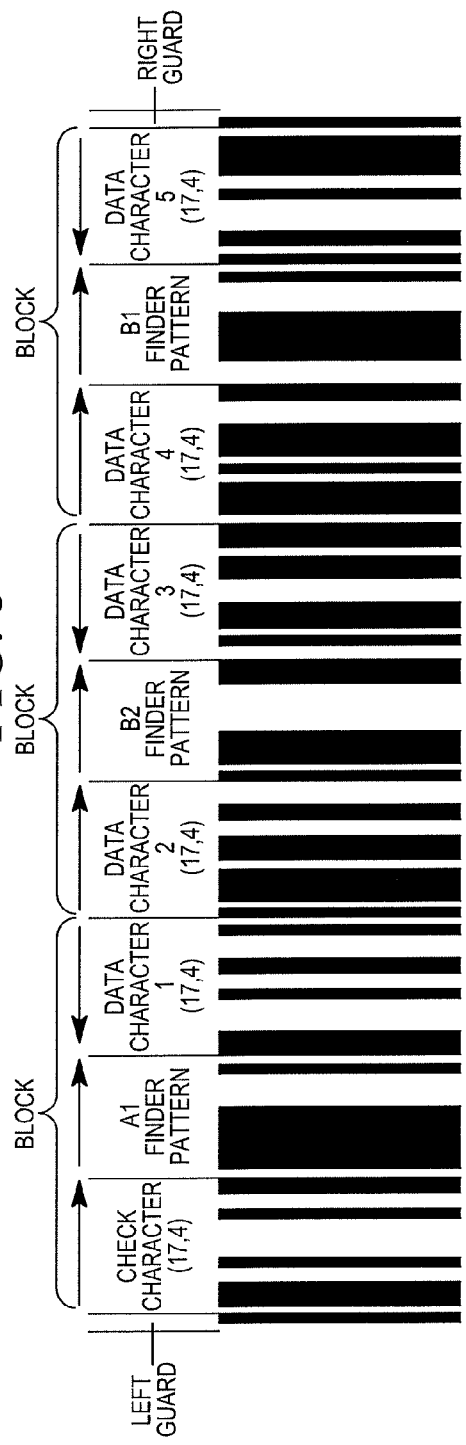
FIG. 4 is a view of an exemplary Databar Expanded symbol depicting a three-block structure in accordance with the prior art.

FIG. 4 depicts a standard exemplary GS1 DataBar Expanded symbol data structure, which is a longer data structure (including a non-visible checksum-digit) comprised of a linear arrangement of bars and spaces (each termed as an element) of different light reflectivities and of various widths that, when decoded, not only uniquely identify a product and its manufacturer, but also can encode additional information, such as sell-by or expiration date, product weight, country of origin, serial number, and lot number, etc. The DataBar Expanded symbol can be of variable length ranging from two blocks or segments to eleven blocks or segments. The exemplary DataBar Expanded symbol of FIG. 4 is composed of three segments or data blocks, each containing a 5-element finder pattern A1, B1 and B2. Finder pattern A1 is bordered by a check character and a data character 1. Finder pattern B1 is bordered by two data characters 2 and 3. Finder pattern B2 is bordered by two data characters 4 and 5. Each character is encoded as four bars and four spaces within seventeen modules and is commonly described by a (17, 4) designation. The A1 finder pattern and the B1 finder pattern each contains a space-bar-space-bar-space sequence, while the B1 finder pattern contains a bar-space-bar-space-bar sequence. Left and right guards are disposed at opposite ends of the symbol. Each guard is comprised of one space and one bar. As is also well known, the checksum-digit is mathematically based on values of the check character and the data characters.

Both DataBar-14 (FIG. 3) and DataBar Expanded (FIG. 4) symbols are decodable and readable by readers of the type depicted in FIG. 1 or FIG. 2. However, as discussed above, a symbol misdecode or misread can occur when these symbols are printed in different polarities, i.e., when they are printed as normal or inverse codes. As noted above, the Databar-14 and the DataBar Expanded symbols do not have an outer margin around them so that the reader cannot evaluate and know what type of code polarity is being read. More specifically, the right finder pattern is, by design, already the inverse of the left finder pattern in the Databar-14 symbol of FIG. 3. Thus, without knowing the polarity, the reader may interpret the right finder pattern as the left finder pattern, or vice versa, and, as a result, a different incorrect code will be read. Analogously, the B2 finder pattern in the Databar Expanded symbol of FIG. 4 may be interpreted as the A1 finder pattern or the B1 finder pattern, or vice versa, and, as a result, a different incorrect code will again be read. This problem is especially characteristic of Databar Expanded symbols having an even number of blocks.

Figure 5:
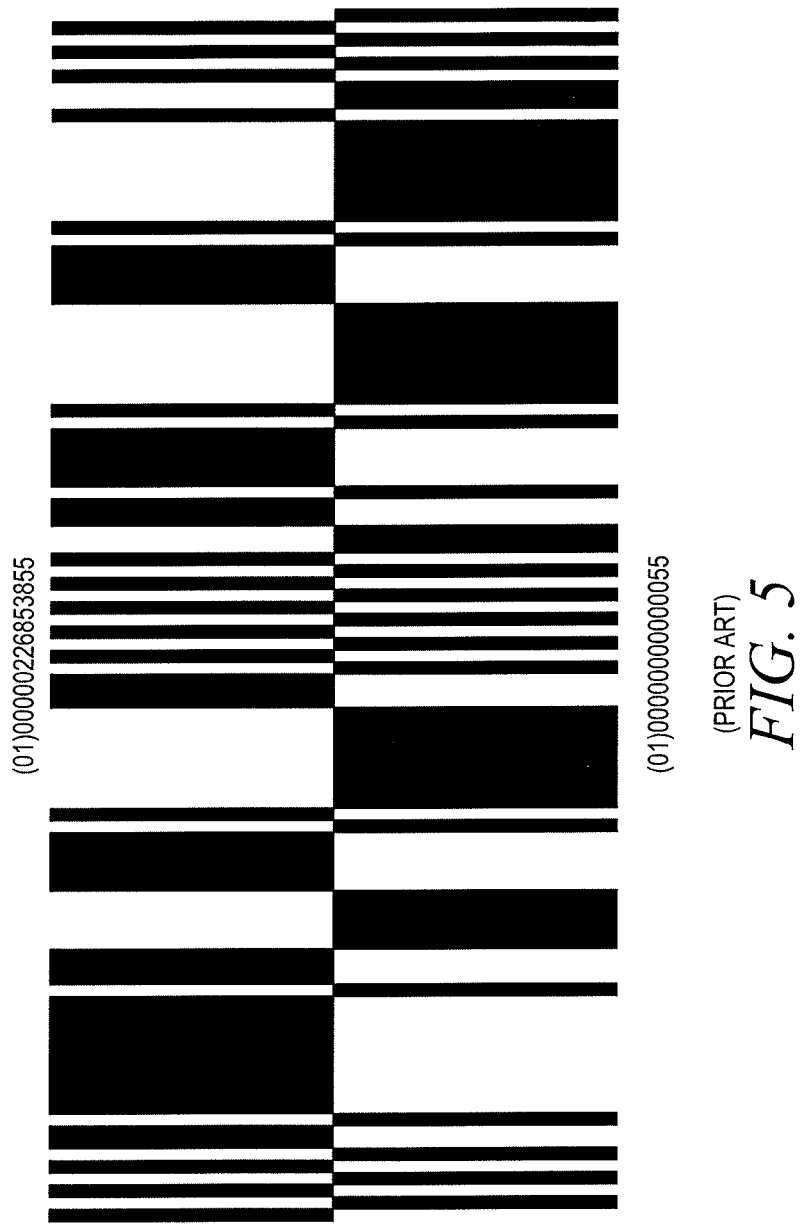
FIG. 5 is a view depicting how two Databar-14 symbols can be misread when printed and interpreted as a normal code and as an inverse code.

By way of example, the lower half of FIG. 5 depicts a Databar-14 symbol, which, when decoded as a normal code, outputs the code of "(01)00000000000055", and the upper half of FIG. 5 depicts a different Databar-14 symbol, which, when decoded as a normal code, outputs the code of "(01) 00000226853855". However, if the Databar-14 symbol at the lower half of FIG. 5 was interpreted as an inverse code, then it would be decoded as "(01)00000226853855". Similarly, if the Databar-14 symbol at the upper half of FIG. 5 was interpreted as an inverse code, then it would be decoded as "(01) 00000000000055". Again, these different outputs are the result of confusion between the finder patterns since the reader does not know what polarity is being decoded and read. Both different output codes are generated, but only one is correct.

In accordance with this invention, such misreads are prevented by simultaneously processing and decoding the electrical signal generated by the data capture assembly not only as a first decoded result of one of the polarities, but also as a second decoded result of the other of the polarities. Then, the validity of these in-parallel generated, first and second decoded results is checked. An output is generated in dependence upon the validity determination.

Figure 6:
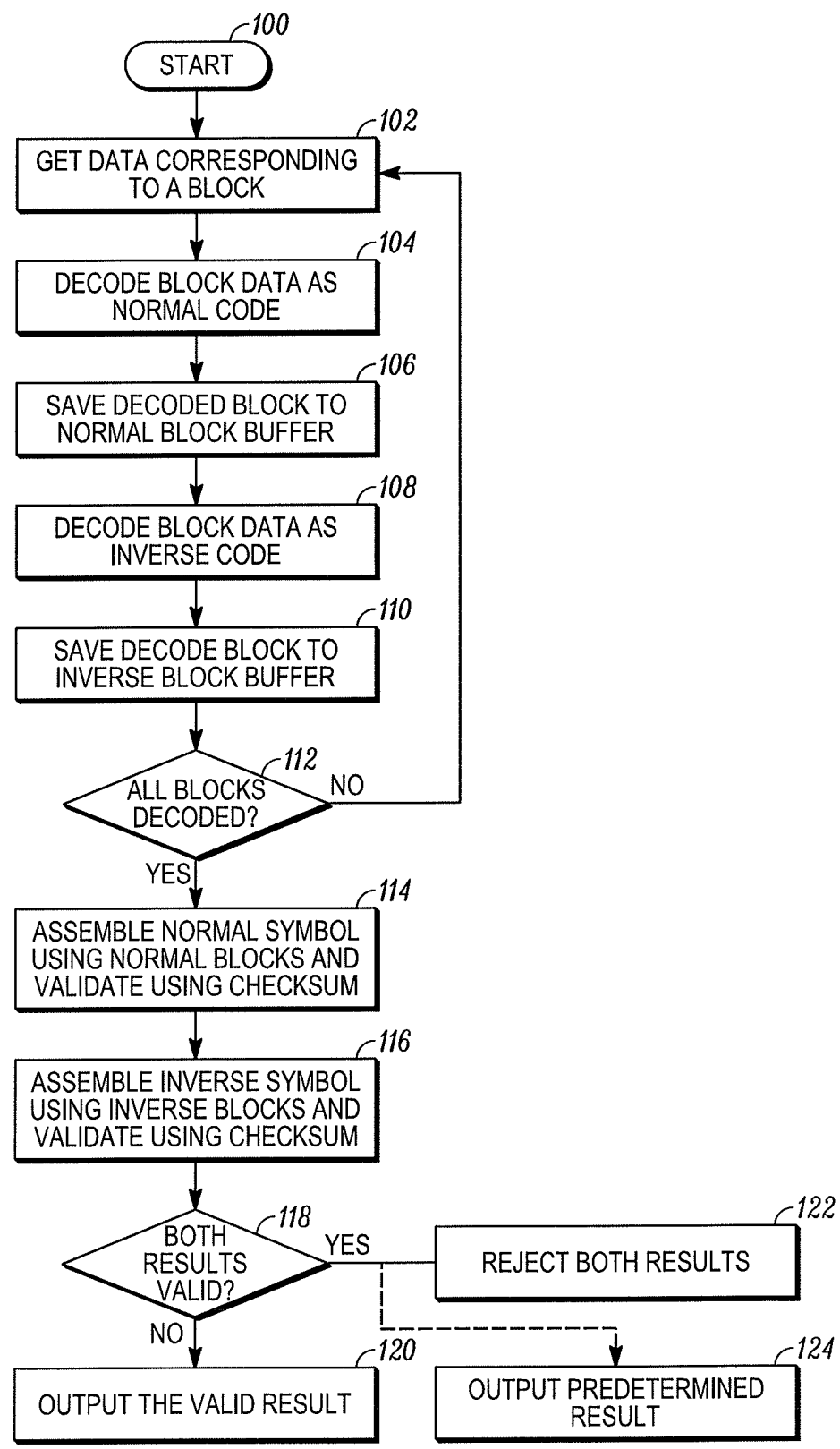
FIG. 6 is a flow chart of steps performed in accordance with the method of the present invention.

With the aid of the flow chart of FIG. 6, beginning in start step 100, the programmed microprocessor or controller 70 is operative for getting a scan to obtain the electrical signal derived from each block of a Databar-14 or Databar Expanded symbol and generated by the digitizer 68 or by the electronic signal processing circuitry associated with the imager 30 in step 102. In step 104, the controller 70 is operative for decoding that electrical signal as a normal code block and, in step 106, for saving that decoded normal code block in a storage buffer. In step 108, the controller 70 is simultaneously operative for decoding that electrical signal as an inverse code block and, in step 110, for saving that decoded inverse code block in a storage buffer. The simultaneous in-parallel processing of the normal and inverse code blocks is repeated in step 112 until all the blocks of the symbol have been processed.

In step 114, all of the stored normal code blocks are assembled or stitched together and validated, preferably using a checksum function, to obtain a first decoded result indicative of a normal code. In step 116, all of the stored inverse code blocks are assembled or stitched together and validated, preferably using a checksum function, to obtain a second decoded result indicative of an inverse code. In step 118, the controller 70 is operative for checking whether either, both, or none of the decoded results are valid.

In step 120, if the first decoded result is valid and the second decoded result is invalid, then the controller 70 is operative for generating the output as the first decoded result, e.g., the normal code. If the second decoded result is valid and the first decoded result is invalid, then the controller 70 is operative for generating the output as the second decoded result, e.g., the inverse code.

However, if both results are valid, then, as shown in step 122, the controller 70 is operative for generating the output as no result, i.e., both results are rejected, and the controller 70 can so alert a user by a warning message, beep, or the like. Alternatively, if both results are valid, then, as shown in step 124, the controller 70 is operative for generating the output as a predetermined one of the first decoded result and the second decoded result. Thus, the controller could, for example, be programmed in advance to generate only the normal code if both results are valid. This mechanism can detect any equivocal patterns and prevent misdecoding.

Hence, the method of preventing a misread of a one-dimensional symbol that can be read in either one of two polarities in an electro-optical reader, is performed by capturing light from the symbol, and generating an electrical signal indicative of the captured light; simultaneously processing and decoding the electrical signal as a first decoded result of one of the polarities and as a second decoded result of the other of the polarities; determining validity of the first and second decoded results; and generating an output in dependence upon the validity determination.

It will be understood that each of the elements described above, or two or more together, also may find a useful application in other types of constructions differing from the types described above.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An arrangement for preventing a misread of a one-dimensional symbol that is read in either one of two polarities in an electro-optical reader, the arrangement comprising:
a data capture assembly for capturing light from the symbol, and for generating an electrical signal indicative of the captured light, wherein the symbol has bars alternating with spaces, wherein the bars have less reflectivity than the spaces when the symbol is a normal code of one of the polarities, and wherein the spaces have less reflectivity than the bars when the symbol is an inverse code of the other of the polarities;
a controller operative for determining whether the electrical signal is indicative of one of a GS1 DataBar-14 symbol and a GS1 DataBar Expanded symbol, each having finder patterns of bars and spaces differently decodable in the two polarities; and
wherein, in the event that electrical signal is indicative of one of a GS1 DataBar-14 symbol and a GS1 DataBar Expanded symbol, the controller is further operative for simultaneously processing and decoding the electrical signal as a first decoded result of one of the polarities and as a second decoded result of the other of the polarities, for determining validity of the first and second decoded results, and for generating an output in dependence upon the validity determination.

2. The arrangement of claim 1, wherein the data capture assembly includes a laser for emitting a laser beam, a scanner for sweeping the laser beam in a scan pattern across the symbol for reflection and scattering therefrom, and a detector for detecting the captured light from the symbol.

3. The arrangement of claim 1, wherein the data capture assembly includes a solid-state imager having an array of sensors for detecting the captured light in a virtual scan pattern from the symbol.

4. The arrangement of claim 1, wherein the controller is operative for generating the output as the first decoded result if the first decoded result is valid and the second decoded result is invalid.

5. The arrangement of claim 1, wherein the controller is operative for generating the output as the second decoded result if the second decoded result is valid and the first decoded result is invalid.

6. The arrangement of claim 1, wherein the controller is operative for generating the output as no result if both the first decoded result and the second decoded result are valid.

7. The arrangement of claim 1, wherein the controller is operative for generating the output as a predetermined one of the first decoded result and the second decoded result if both the first decoded result and the second decoded result are valid.

8. The arrangement of claim 1, wherein the controller is operative for determining validity by checking each of the results with a checksum function.

9. A method of preventing a misread of a one-dimensional symbol that is read in either one of two polarities in an electro-optical reader, the method comprising:
capturing light from the symbol, and generating an electrical signal indicative of the captured light, wherein the symbol has bars alternating with spaces, wherein the bars have less reflectivity than the spaces when the symbol is a normal code of one of the polarities, and wherein the spaces have less reflectivity than the bars when the symbol is an inverse code of the other of the polarities;
in the event that electrical signal is indicative of one of a GS1 DataBar-14 symbol and a GS1 DataBar Expanded symbol, simultaneously processing and decoding the electrical signal as a first decoded result of one of the polarities and as a second decoded result of the other of the polarities, determining validity of the first and second decoded results, and generating an output in dependence upon the validity determination.

10. The method of claim 9, wherein the capturing is performed by sweeping a laser beam in a scan pattern across the symbol for reflection and scattering therefrom, and detecting the captured light from the symbol.

11. The method of claim 9, wherein the capturing is performed by detecting the captured light in a virtual scan pattern from the symbol with an array of sensors.

12. The method of claim 9, wherein the generating is performed by generating the output as the first decoded result if the first decoded result is valid and the second decoded result is invalid.

13. The method of claim 9, wherein the generating is performed by generating the output as the second decoded result if the second decoded result is valid and the first decoded result is invalid.

14. The method of claim 9, wherein the generating is performed by generating the output as no result if both the first decoded result and the second decoded result are valid.

15. The method of claim 9, wherein the generating is performed by generating the output as a predetermined one of the first decoded result and the second decoded result if both the first decoded result and the second decoded result are valid.

16. The method of claim 9, and determining validity by checking each of the results with a checksum function.

* * * * *